United States Patent
Galuska et al.

(10) Patent No.: US 11,758,932 B2
(45) Date of Patent: Sep. 19, 2023

(54) INFUSED CRANBERRIES AND METHODS OF MAKING

(71) Applicant: General Mills, Inc., Minneapolis, MN (US)

(72) Inventors: Peter J Galuska, Hudson, WI (US); Eric Gugger, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 190 days.

(21) Appl. No.: 16/952,222

(22) Filed: Nov. 19, 2020

(65) Prior Publication Data
US 2021/0153532 A1 May 27, 2021

Related U.S. Application Data

(60) Provisional application No. 62/938,393, filed on Nov. 21, 2019.

(51) Int. Cl.
| | |
|---|---|
| *A23L 19/00* | (2016.01) |
| *A23L 29/30* | (2016.01) |
| *A23L 33/21* | (2016.01) |
| *A23B 7/022* | (2006.01) |
| *A23L 3/42* | (2006.01) |
| *A23L 29/00* | (2016.01) |

(52) U.S. Cl.
CPC .............. *A23L 19/03* (2016.08); *A23B 7/022* (2013.01); *A23L 3/42* (2013.01); *A23L 29/035* (2016.08); *A23L 29/37* (2016.08); *A23L 33/21* (2016.08); *A23V 2002/00* (2013.01)

(58) Field of Classification Search
CPC .......... A23L 19/03; A23L 33/21; A23B 7/022
See application file for complete search history.

(56) References Cited

U.S. PATENT DOCUMENTS

| | | | |
|---|---|---|---|
| 6,143,345 A * | 11/2000 | Gonze | A23G 1/16 |
| | | | 426/660 |
| 8,597,714 B1 | 12/2013 | Sinha et al. | |
| 2005/0064082 A1* | 3/2005 | Froseth | A23L 19/03 |
| | | | 426/615 |
| 2007/0031553 A1 | 2/2007 | Sinha et al. | |
| 2010/0129517 A1* | 5/2010 | Vercauteren | A23L 27/84 |
| | | | 426/577 |
| 2011/0256279 A1 | 10/2011 | Roy et al. | |
| 2013/0040024 A1 | 2/2013 | Fletcher et al. | |
| 2013/0101706 A1* | 4/2013 | Haseleu | A23G 1/54 |
| | | | 426/291 |
| 2014/0342044 A1* | 11/2014 | Bell | A23L 29/37 |
| | | | 426/108 |
| 2017/0265508 A1 | 9/2017 | Roy et al. | |

* cited by examiner

*Primary Examiner* — Jeffrey P Mornhinweg
(74) *Attorney, Agent, or Firm* — Diederiks & Whitelaw, PLC; John L. Crimmins, Esq.; Rachel A. Kahler

(57) ABSTRACT

Described are dried cranberries with reduced sugar content, while retaining a desired sweetness and texture, and methods of making such dried cranberries. Dried cranberries include erythritol and a sweetener that interferes with erythritol crystallization.

19 Claims, No Drawings

INFUSED CRANBERRIES AND METHODS OF MAKING

BACKGROUND

Commercially available dried cranberries are high in sugar content despite the low natural sugar content found in fresh cranberries. The high sugar content in commercially available dried cranberries is generally achieved by infusing cranberries with a sugar solution, which provides a desired sweetness and texture that consumers prefer.

DETAILED DESCRIPTION

The inventors of the present application were tasked with producing dried cranberries with reduced sugar content, while retaining a desired sweetness and texture. Replacing sugar with erythritol was initially considered, but it was found that the resulting dried cranberries had an undesirable cooling effect in the mouth upon consumption. Such dried cranberries also had a crystalline texture rather than a texture similar to commercially available dried cranberries that consumers enjoy.

It was discovered, and is described herein, that infused cranberries can be produced that have a desired sweetness level, but with significantly reduced sugar content. In some embodiments, such infused cranberries can be essentially free of sugar and/or have essentially no net carbohydrates.

The infused cranberries provided herein include erythritol and at least one other ingredient as described herein. Although erythritol has a characteristic cooling sensation in the mouth when consumed, the infused cranberries described herein are created using methods that reduce the cooling effect. In addition, the infused cranberries provided herein retain a desirable texture.

Methods of making infused cranberries are provided herein. A method includes incubating cranberries with a solution that includes erythritol and at least one additional ingredient, aside from water. A solution provided herein includes erythritol and a sweetener that interferes with erythritol crystallization. Preferably, a sweetener that interferes with erythritol crystallization is non-nutritive or provides less than half of the calories than the same mass of sucrose. Suitable sweeteners include, for example, allulose, sorbitol, xylitol, and maltitol, or any combination thereof. In some embodiments, erythritol can be included in a solution in an amount of from about 20% to about 50% (e.g., about 30% to about 45%, or about 35% to about 40%) by weight of the solution. In some embodiments, a sweetener that interferes with erythritol crystallization can be included in a solution in an amount of from about 5% to about 20% (e.g., about 7% to about 18%, or about 10% to about 15%). In some embodiments, erythritol and a sweetener that interferes with erythritol crystallization can be included at a ratio of from about 6:1 to about 1:4 (e.g., about 4:1 to about 1:1, or about 3:1). A sweetener that interferes with crystallization of erythritol can help reduce the cooling effect typically imparted by erythritol. However, too little crystallization of erythritol can result in infused cranberries being sticky once dried.

In some embodiments, a solution can also include a soluble fiber. Suitable soluble fibers include, for example, inulin, soluble corn fiber, polydextrose, and the like, or any combination thereof. In some embodiments, a soluble fiber can be included as a liquid soluble fiber. While water can be added to a solution provided herein, in some embodiments, a liquid soluble fiber can provide at least 50% (e.g., at least 80%, at least 90%, or substantially all) of the water in a solution. In some embodiments, a soluble fiber can be selected to be a source of sweetness for the resulting infused cranberries. In some embodiments, a soluble fiber can be included in an amount of from about 5% to about 50% (e.g., about 20% to about 40%, or about 25% to about 35%) by weight of a solution.

In some embodiments, a solution can include glycerol. Glycerol can reduce water activity in infused cranberries. In some embodiments, glycerol can reduce hardness and/or brittleness in infused cranberries once dried. In some embodiments, glycerol can increase suppleness in dried infused cranberries. In some embodiments, glycerol can be included in an amount of from about 5% to about 50% (e.g., about 10% to about 30%, or about 15% to about 25%) by weight of the solution. In some embodiments, a solution provided herein can include a liquid soluble fiber and glycerol as the only liquid components in the solution.

In some embodiments, a solution can include a high intensity sweetener. Suitable high intensity sweeteners can be natural or artificially made. Examples include, without limitation, stevia extract, saccharine, sucralose, and the like, or any combination thereof. A high intensity sweetener can provide additional sweetness without interfering with a desired texture of an infused cranberry made according to a method provided herein. Typically, high intensity sweeteners are included in an amount of less than about 1% of a solution.

In some embodiments, a solution can include an alkalizing agent. An alkalizing agent can be included to adjust the pH of the solution before or during incubation with cranberries. In some embodiments, an alkalizing agent can be added to achieve a solution pH of from about 3.0 to about 3.3 (e.g., about 3.05 to about 3.25) after incubation with cranberries. It has been observed that a pH below about 3.0 can be perceived as less sweet than the preferred pH range, while a pH above about 3.3 can be perceived as having a reduced cranberry flavor than the preferred pH range. Suitable alkalizing agents include, for example, calcium carbonate, sodium hydroxide, and the like, or any combination thereof.

In some embodiments, a solution can include additional ingredients, such as flavorants, colorants, spices, and the like.

A solution provided herein can be made using an appropriate method. In some embodiments, combined ingredients of a solution can be heated to a temperature of at least 200° F. (e.g., about 200° F. to about 250° F., or about 230° F. to about 240° F.) to improve solubility of at least the erythritol. A solution provided herein is preferably at or above 50° F. (e.g., room temperature to about 250° F.) when it is applied to cranberries. A solution can be applied to cranberries at any ratio, but in a batch system, a good ratio can be from about 4:1 to 1:4 (e.g., about 2:1 to about 1:2) by weight. In a continuous system, the ratio can be adjusted based on how much of the solution is absorbed by cranberries.

Any cranberries (e.g., fresh, frozen, or dehydrated) can be used in a method provided herein. Preferably, cranberries used in a method provided herein have a skin that has one or more entry point. For example, cranberries can have skins that are abraded, cut, pierced or otherwise compromised to improve entry of a solution into the cranberries. Any method can be used to compromise the skin of cranberries prior to or during incubation with a solution provided herein. For example, cranberries can be crushed, frozen and optionally thawed, treated with an electric field, abraded, or the like before or during incubation with a solution provided herein. In some embodiments, suitable cranberries are deseeded.

Preferably, cranberries are at a temperature that prevents crystallization of erythritol when a solution is applied to the cranberries. For example, cranberries can be at a temperature of at least 40° F. (e.g., at least 50° F., or about room temperature). In some embodiments, if cranberries are sufficiently cold to induce crystallization of erythritol, or erythritol crystallizes for some other reason, a solution can be warmed while combined with cranberries to solubilize the erythritol.

Cranberries and solution can be combined using any suitable method to produce a mixture. In some embodiments, a mixture can be treated to express air from pockets within the cranberries. For example, a mixture can be agitated (e.g., by stirring or vibration), the cranberries can be pressed, or a vacuum can be applied to a mixture to encourage expression of air from pockets within the cranberries.

A mixture including cranberries and a solution provided herein is incubated under conditions sufficient to infuse the cranberries with the solution. In some embodiments, a mixture can be incubated at room temperature for about 10 hours to about 30 hours (e.g., about 12 hours to about 24 hours) to infuse the cranberries in the mixture. In some embodiments, a mixture can be incubated at conditions that accelerate infusion, such as under vacuum (e.g., at a temperature above freezing) or at a temperature warmer than room temperature for part or all of the incubation period. In some embodiments, a mixture can be at a different temperature at the beginning of the incubation period than at the end of incubation.

Typically, at least some of the solution in a mixture is absorbed by the cranberries to produce infused cranberries. In some embodiments, some or all of any excess solution can be drained from infused cranberries. Excess solution can be reused or discarded. In some embodiments, excess solution need not be drained.

In some embodiments, infused cranberries made by a method provided herein can be used and/or packaged as-is. In some embodiments, infused cranberries can be frozen and packaged for later use, e.g., to make a cranberry sauce without the need for added sugar.

In some embodiments, infused cranberries made by a method provided herein can be dried. Any suitable method can be used to dry infused cranberries. In some embodiments, a dried infused cranberry provided herein can have a water content of less than 30% (e.g., about 20% to about 25%, or about 22% to about 25%) by weight. In some embodiments, a dried infused cranberry provided herein can have a water activity of less than 0.65 (e.g., about 0.15 to about 0.62, or about 0.40 to about 0.50).

Infused cranberries can be combined with any suitable food ingredients to produce foods. For example, infused cranberries can be included in baked goods, ready-to-eat (RTE) cereals, snack bars, trail mixes, or the like. Such infused cranberries can help control sugar and/or carbohydrate content in such foods while imparting sweetness and/or cranberry flavor to such foods. For example, a dried infused cranberry provided herein can be used to make a low or no net carbohydrate RTE breakfast cereal. In another example, an infused cranberry (dried or not) can be used to make a low net carbohydrate muffin, bread, or cake.

The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A method of making a food composition, comprising:
   a. providing cranberries,
   b. applying a solution to the cranberries to form a mixture, the solution including:
      i. about 20% to about 50% erythritol;
      ii. soluble fiber;
      iii. glycerol; and
      iv. a compound selected from allulose, xylitol, maltitol, sorbitol, and any combination thereof, and present in an amount configured to interfere with crystallization of the erythritol, wherein the solution is at a temperature of from about 200 to about 250° F., the temperature being configured to improve solubility of the erythritol;
   c. incubating the mixture for sufficient time to infuse the cranberries with the solution to produce infused cranberries.

2. The method of claim 1, wherein the solution comprises:
   a. about 30% to about 45% erythritol;
   b. about 5% to about 50% soluble fiber;
   c. about 5% to about 50% glycerol; and
   d. about 5% to about 20% of the compound selected from allulose, xylitol, maltitol, sorbitol, and any combination thereof.

3. The method of claim 1, wherein the mixture has a pH of from about 3.0 to 3.3 following the incubating step.

4. The method of claim 1, wherein the solution further comprises an alkalizing agent.

5. The method of claim 1, wherein the cranberries are at a temperature of at least 40° F. when the solution is applied to the cranberries.

6. The method of claim 1, further comprising drying the infused cranberries.

7. The method of claim 1, further comprising draining the infused cranberries.

8. Infused cranberries made by a method according to claim 1.

9. A method of making a food composition, comprising:
   a. providing cranberries,
   b. applying a solution to the cranberries to form a mixture, the solution including:
      i. about 20% to about 50% erythritol; and
      ii. allulose in an amount configured to interfere with crystallization of the erythritol, wherein the solution is at a temperature of from about 200 to about 250° F., the temperature being configured to improve solubility of the erythritol;
   c. incubating the mixture for sufficient time to infuse the cranberries with the solution to produce infused cranberries.

10. The method of claim 9, wherein the solution comprises:
    a. about 30% to about 45% erythritol; and
    b. about 5% to about 20% of allulose.

11. The method of claim 10, wherein the solution includes erythritol and allulose at a ratio of from about 6:1 to 1:4.

12. The method of claim 9, wherein the mixture has a pH of from about 3.0 to 3.3 following the incubating step.

13. The method of claim 9, wherein the solution further comprises an alkalizing agent.

14. The method of claim 9, wherein the incubating step comprises holding the mixture at room temperature for about 10 hours to about 30 hours.

15. The method of claim 9, wherein the cranberries are at a temperature of at least 40° F. when the solution is applied to the cranberries.

16. The method of claim 9, further comprising drying the infused cranberries.

17. The method of claim 9, further comprising draining the infused cranberries.

18. Infused cranberries made by a method according to claim 9.

19. The method of claim 1, wherein the incubating step comprises holding the mixture at room temperature for about 10 hours to about 30 hours.

* * * * *